United States Patent [19]
Inazuka et al.

[11] Patent Number: 5,634,815
[45] Date of Patent: Jun. 3, 1997

[54] BATTERY RECEIVING MECHANISM

[75] Inventors: Masahiro Inazuka; Kazunori Osakabe, both of Tokyo, Japan

[73] Assignee: Asahi Kogaku Kogyo Kabushiki Kaisha, Tokyo, Japan

[21] Appl. No.: 428,649

[22] Filed: Apr. 25, 1995

[30] Foreign Application Priority Data

Apr. 26, 1994 [JP] Japan ................. 6-004493 U

[51] Int. Cl.$^6$ ..................................... H01R 3/00
[52] U.S. Cl. ................ 439/500; 200/51.12; 429/97; 429/100; 439/160
[58] Field of Search ................... 439/159, 160, 439/500, 627; 429/97, 99, 100; 200/51.12, 558, 568; 320/2

[56] References Cited

U.S. PATENT DOCUMENTS

| | | |
|---|---|---|
| 2,483,665 | 10/1949 | Phillips ................. 200/51.12 |
| 2,898,423 | 8/1959 | Collins ................. 200/558 |
| 3,897,268 | 7/1975 | Haraguchi . |
| 3,936,846 | 2/1976 | Haraguchi . |
| 4,778,953 | 10/1988 | Kato ................. 200/568 |
| 4,863,812 | 9/1989 | Ueda et al. . |
| 4,993,973 | 2/1991 | Selinko ................. 439/500 |
| 5,077,572 | 12/1991 | Morisawa . |
| 5,118,912 | 6/1992 | Itabashi . |
| 5,177,424 | 1/1993 | Connors ................. 320/2 |
| 5,194,340 | 3/1993 | Kosako . |
| 5,315,336 | 5/1994 | Suzuka et al. . |
| 5,505,635 | 4/1996 | Willows et al. ................. 429/97 |

*Primary Examiner*—Gary E. Elkins
*Attorney, Agent, or Firm*—Greenblum & Bernstein, P.L.C.

[57] ABSTRACT

A battery receiving mechanism includes a battery chamber which receives a battery therein and a conductor which is connected to one terminal of said battery. A biasing member biases the battery in a direction to connect the terminal of the battery to the conductor. An operating member moves the battery to disconnect the terminal battery from the conductor against biasing force of the biasing member upon application of an external force.

9 Claims, 6 Drawing Sheets

BATTERY RECEIVING MECHANISM

BACKGROUND OF THE INVENTION

The present invention relates to a battery receiving mechanism for a camera or the like.

1. Field of the Invention

The present invention relates to a battery receiving mechanism for a camera or the like.

2. Description of the Related Art

A microcomputer incorporated in a camera stores a predetermined mode or data when a power switch is turned OFF as long as a battery (or batteries) remains in a battery chamber. Consequently, a user cannot reset the data of the microcomputer after the battery is inserted into the battery chamber through a routine operation without interrupting the power supply. Namely, to reset the microcomputer, it is necessary to open a cover of the battery chamber to interrupt the power supply to the microcomputer, and then close the cover of the battery chamber to supply power to the microcomputer.

However, when the chamber cover is opened to interrupt the power supply, there is a possibility that the battery will accidentally fall out of the battery chamber. Moreover, if the chamber cover is secured to the chamber body by a screw (or screws), the screw(s) must be loosened or disengaged, which is somewhat troublesome.

SUMMARY OF THE INVENTION

The primary object of the present invention is to provide a battery receiving mechanism in which an electronic device or electronic circuit, such as a microcomputer can be reset without opening a chamber cover of the battery receiving mechanism.

To achieve the object mentioned above, according to the present invention, there is provided a battery receiving mechanism including a battery chamber which receives a battery therein, and a conductor connected to a terminal of the battery. A biasing member biases the battery in a direction to connect the terminal of the battery to the conductor. An operating means moves the battery in a direction to disconnect the terminal of the battery from the conductor against the biasing force upon receipt of an external force.

According to another aspect of the present invention, there is provided a battery receiving mechanism including a battery chamber which receives a battery therein and a conductor connected to a terminal of the battery. A biasing member biases the battery in a direction to connect the terminal of the battery to the conductor. An opening is provided in the wall of the battery chamber opposite to the terminal of the battery to open it to the outside.

According to still another aspect of the present invention, there is provided a battery receiving mechanism including a battery chamber which receives a battery therein, and a conductor connected to a terminal of the battery. A biasing member biases the battery in a direction to connect the terminal of the battery to the conductor. An elastically deformable member provided on the wall of the battery chamber opposite to the terminal of the battery, and which deforms when a predetermined external force is applied thereto to move the battery, disconnecting the terminal from the conductor.

According to still another aspect of the present invention, a battery receiving mechanism includes a battery chamber which receives a battery therein and a conductor connected to a terminal of the battery. A biasing member biases the battery in a direction to connect the battery to the conductor and which is connected to the other terminal of the battery. An operating means moves the battery in a direction to disconnect the terminal of the battery from the conductor against the biasing force upon receipt of an external force.

The present disclosure relates to subject matter contained in Japanese utility model application No. 06-4493 (filed on Apr. 26, 1994) which is expressly incorporated herein by reference in its entirety.

BRIEF DESCRIPTION OF THE DRAWINGS

The invention will be described below with reference to the accompanying drawings, in which.

DESCRIPTION OF THE PREFERRED EMBODIMENT

Figure 5:
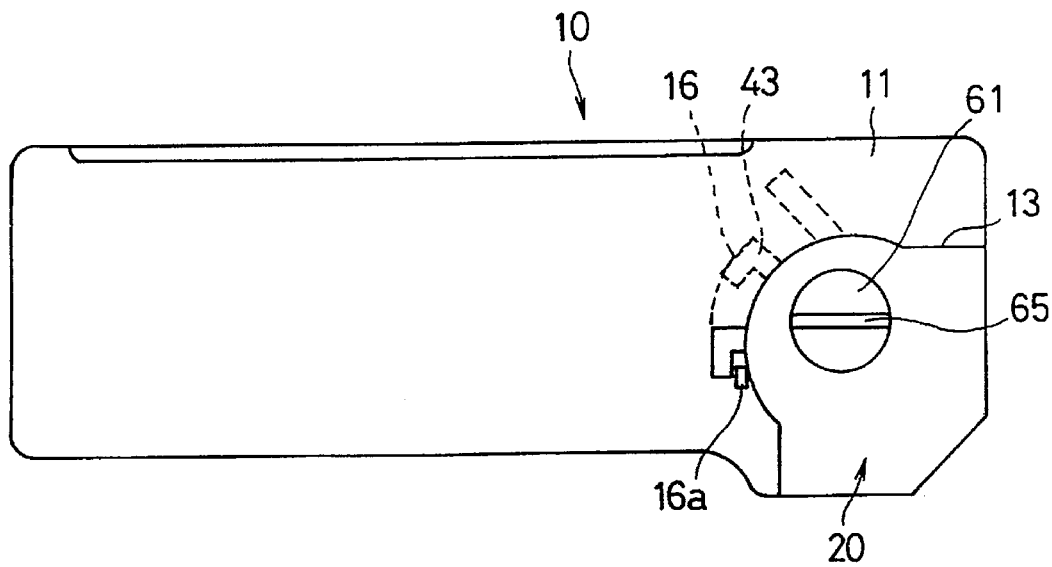
FIG. 5 is a bottom view of a camera having a battery chamber with a chamber cover, according to the present invention.

FIG. 5 shows a bottom view of a camera having a battery receiving mechanism according to a first embodiment of the present invention.

A chamber cover 20 is detachably attached or pivoted to an open end 13 of a battery chamber 12 provided on a bottom of a camera body 10 to open and close the open end 13. The chamber cover 20 will be discussed below with reference to FIGS. 1 through 4.

Figure 1:
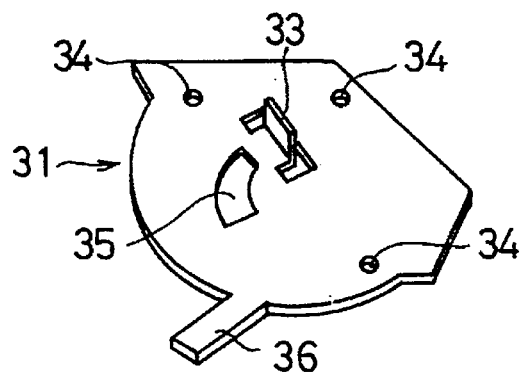
FIG. 1 is an exploded perspective view of a battery receiving mechanism having a battery chamber with a chamber cover to which the present invention is applied.
Figure 1:
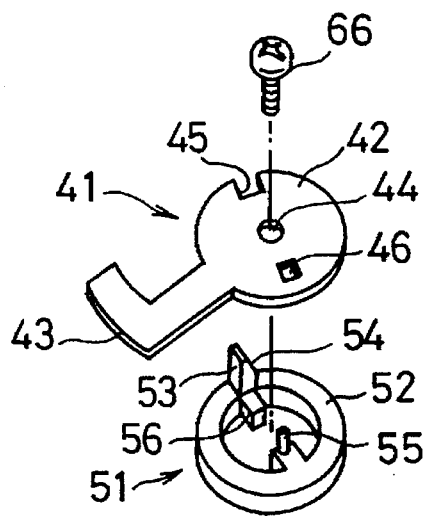
Figure 1:
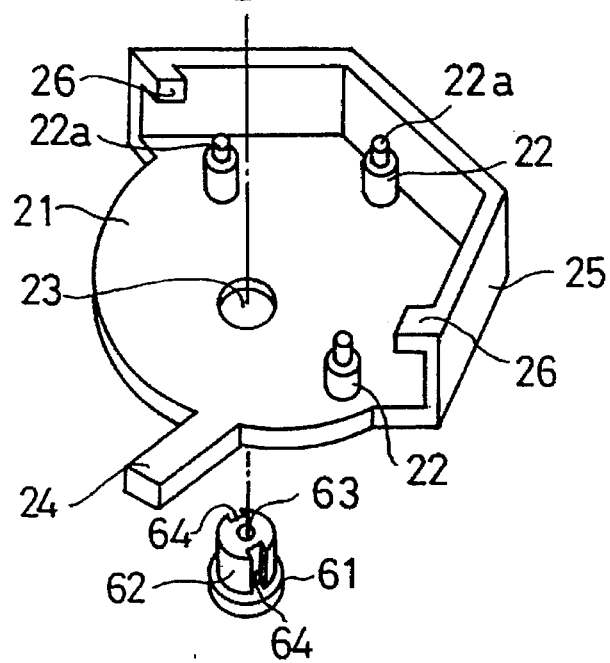
Figure 2:
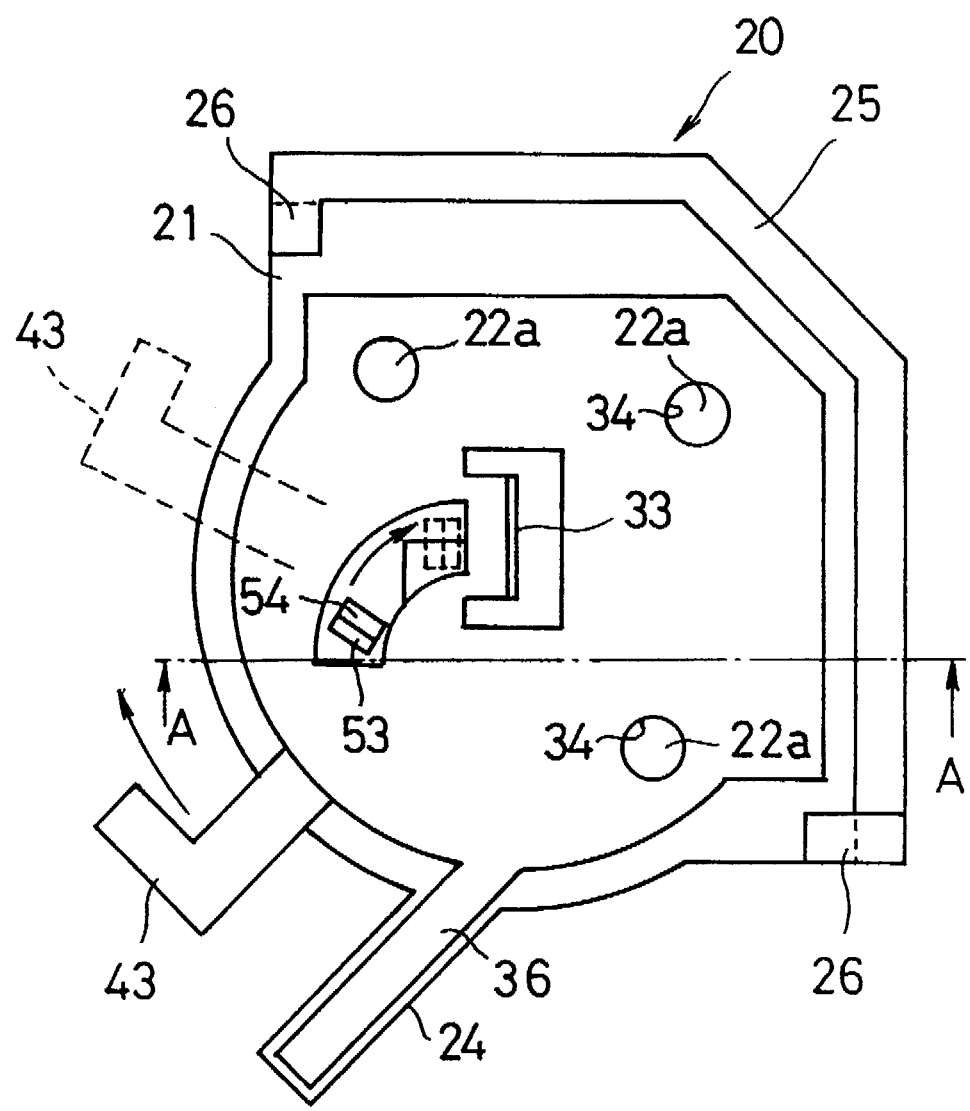
FIG. 2 is a plan view of a battery chamber with a chamber cover, viewed from the inside of the battery chamber, according to the present invention.
Figure 3:
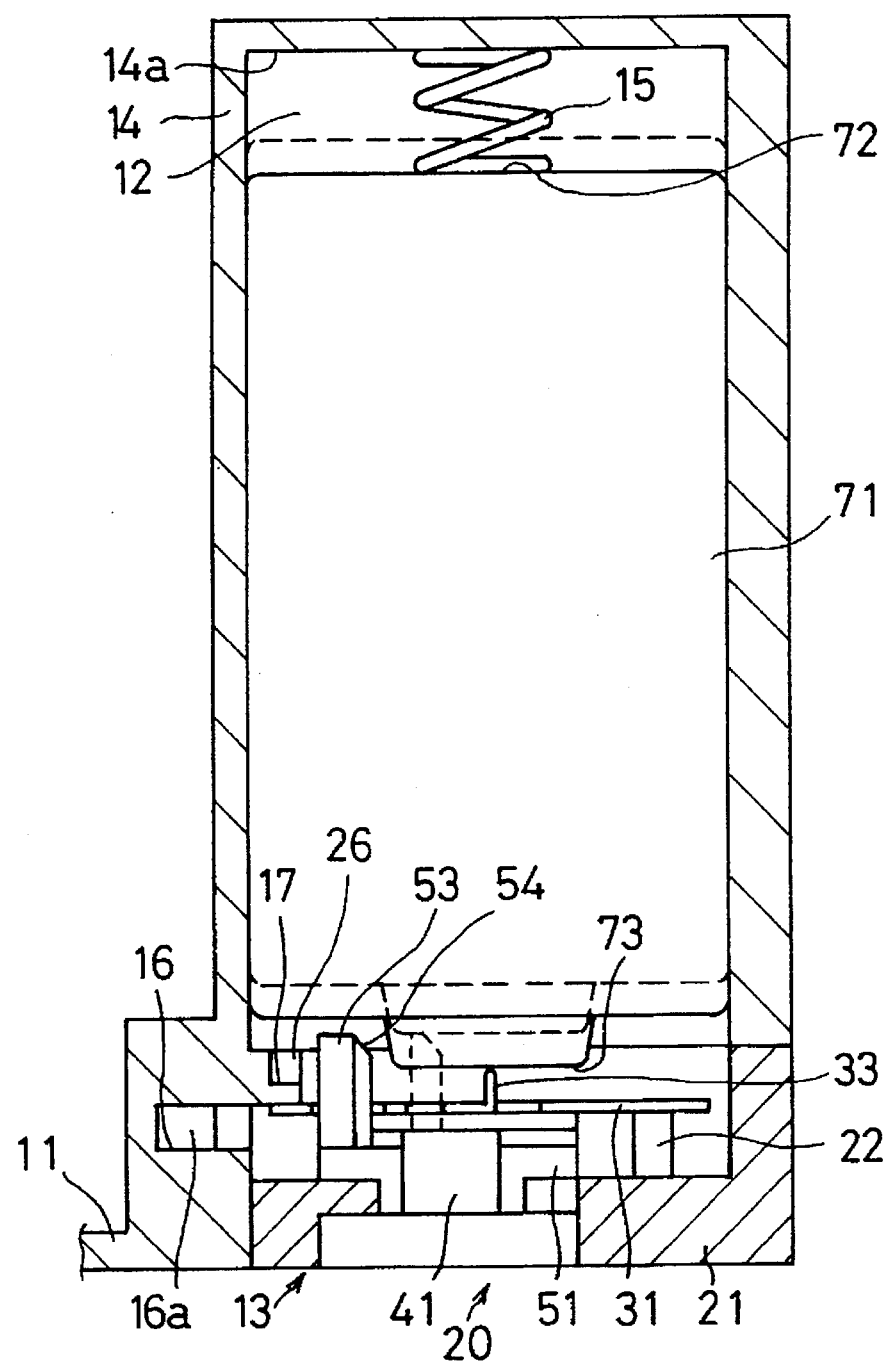
FIG. 3 is a sectional view of a battery chamber with a chamber cover in a locked position, taken along the line A—A in FIG. 2.

Referring specifically to FIG. 3, the battery chamber 12 is comprised of a wall member 14 whose inner end surface 14a is provided with an electrically conductive resilient contact piece 15 with which one of the terminals of a battery 71 (electrode 72) is brought into elastic contact to establish an electrical connection therebetween. The contact piece 15 is an electrically conductive material and is in the form of a coil spring so as to deform elastically (extended or compressed). Namely, the battery 71 is continuously biased in the downward direction so that the electrical connection of the other terminal 73 of the battery 71 is ensured.

The chamber cover 20 is provided at open end 13 of the battery chamber 12 to prevent the battery 71 from protruding or dropping from the battery chamber 12. The chamber cover 20 is comprised of a cover body 21, a conductor piece 33 which comes into contact with the terminal 73 of the battery 71 accommodated in the battery chamber 12 to establish an electrical connection therebetween, a locking plate 41 adapted to lock the chamber cover 20 to the open end 13, a reset member (working member or actuator) 51 actuated to move the battery 71 in a direction in which the terminal 73 of the battery 71 is disconnected from the conductor piece 33, and a reset driver 61 which drives the reset member 51.

The conductor piece 33 is integrally formed with a conductor plate 31 of an electrically conductive metal, such as copper, by cutting and bending a part of the metal plate 31. The conductor plate 31 is supported on three posts 22 provided on the cover body 21 to define a space between the cover body 21 and the conductor plate 31, so that the conductor plate 31, the locking plate 41 and the reset member 51, etc., can be accommodated. The supporting posts 22 are provided on the front ends (upper ends) thereof with small diameter portions 22a which fit in corresponding holes 34 formed in the conductor plate 31. The conductor plate 31 is provided with an engaging portion (arm) 36, whose shape corresponds to the shape of an engaging portion (arm) 24 of the cover body 21, so that the engaging portion 36 fit in an engaging groove (not shown) formed in the open end 13. The conductor plate 31 (conductor piece 33) and the contact piece 15 are electrically connected to electrical components (not shown) within the camera body.

The locking plate 41 is provided with a circular disc body 42 and a generally L-shaped engaging portion 43 which engages with a locking groove 16 formed in the open end 13. The disc body 42 is provided on the center portion thereof with an axial hole 44, and an engaging recess 45 on the outer peripheral surface thereof. The disc body 42 is also provided with an engaging hole 46, so that the axial hole 44 is located between the engaging hole 46 and the engaging recess 45.

The locking plate 41 is disposed between the cover body 21 and the conductor plate 31 through the reset member 51. The reset member 51 is made of an annular body 52 provided with a driving projection 53 whose front end (upper end) forms an oblique surface 54 which serves as a cam surface. The driving projection 53 engages the engaging recess 45 of the locking plate 41 and extends through an archshaped elongated opening 35 formed in the conductor plate 31 to protrude into the battery chamber 12. Namely, when the reset member 51 is rotated in a reset direction, the oblique surface 54 comes into sliding contact with the terminal 73 to press the battery 71 in the reset direction against the spring force of the resilient contact piece 15.

The reset member 51 is also provided with a projection 55 provided on the upper surface of the annular body 52 and a pair of diametrically opposed projections 56 that protrude from the inner peripheral surface of the annular body 52 in the radial direction. The projections 56 are engaged in corresponding longitudinal grooves 64 formed on a shaft portion 62 of the reset driver 61 and extending in a direction parallel with the axis of the shaft portion 62.

The cover body 21 is provided with a hole 23 in which the shaft portion 62 of the driver 61 is inserted from the outside of the battery chamber 12. The locking plate 41, the reset member 51, and the driver 61 connected by a machine screw 66 inserted in the axial hole 44 of the locking plate 41 and screwed in a threaded hole 63 formed in the front end of the shaft portion 62. With this arrangement, the driver 61, the reset member 51 and the locking plate 41 are integrally supported on the cover body 21 to rotate together. Note that the driver 61 is provided on the outer end surface thereof with a groove 65 (FIG. 5), so that the driver 61 can be easily rotated, for example by a coin or the like, inserted in the groove 65.

The cover body 21 is provided with an engaging portion (arm) 24 which projects outward from the outer peripheral surface of the cover body 21 to serve as an abutment to secure the chamber cover 20 to the camera body 11, an upright guide wall 25 provided on the peripheral edge of the cover body 21, and engaging portions 26 provided on opposite ends of the guide wall 25 and project from the upper edge of the guide wall 25 in the radial direction.

The engaging portions 24 and 26 engage in the engaging grooves 17 formed in the camera body 11 in the direction perpendicular to the longitudinal direction of the battery chamber 12. The engagement of the engaging portions 24 and 26 in the engaging grooves 17 ensure that the chamber cover 20 is held so as not to move in the longitudinal direction of the battery chamber 12, i.e., in the direction of the removal or insertion of the battery 71.

The driver 61 is rotated in the locking direction after the cover 20 is fitted in the opening 13. Namely, the engaging portion 43 rotates to engage with the locking groove 16. As a result, the engaging portion 43 comes into sliding contact with the locking groove 16, so that the hook portion of the front end of the engaging portion 43 engages with the locking projection 16a formed in the locking groove 16. When the oblique surface (cam surface) 54 abuts against the terminal 73, the rotation load suddenly increases. In this position, the rotation of the driver 61 stops. This position corresponds to a locked position in which no accidental detachment of the chamber cover 20 occur due to the engagement of the engaging portion 43 and the locking projection 16a. The chamber cover 20 is usually in the locked position. The locking direction corresponds to the clockwise direction in FIGS. 1 and 2, and the counterclockwise direction in FIG. 5, respectively.

Figure 4:
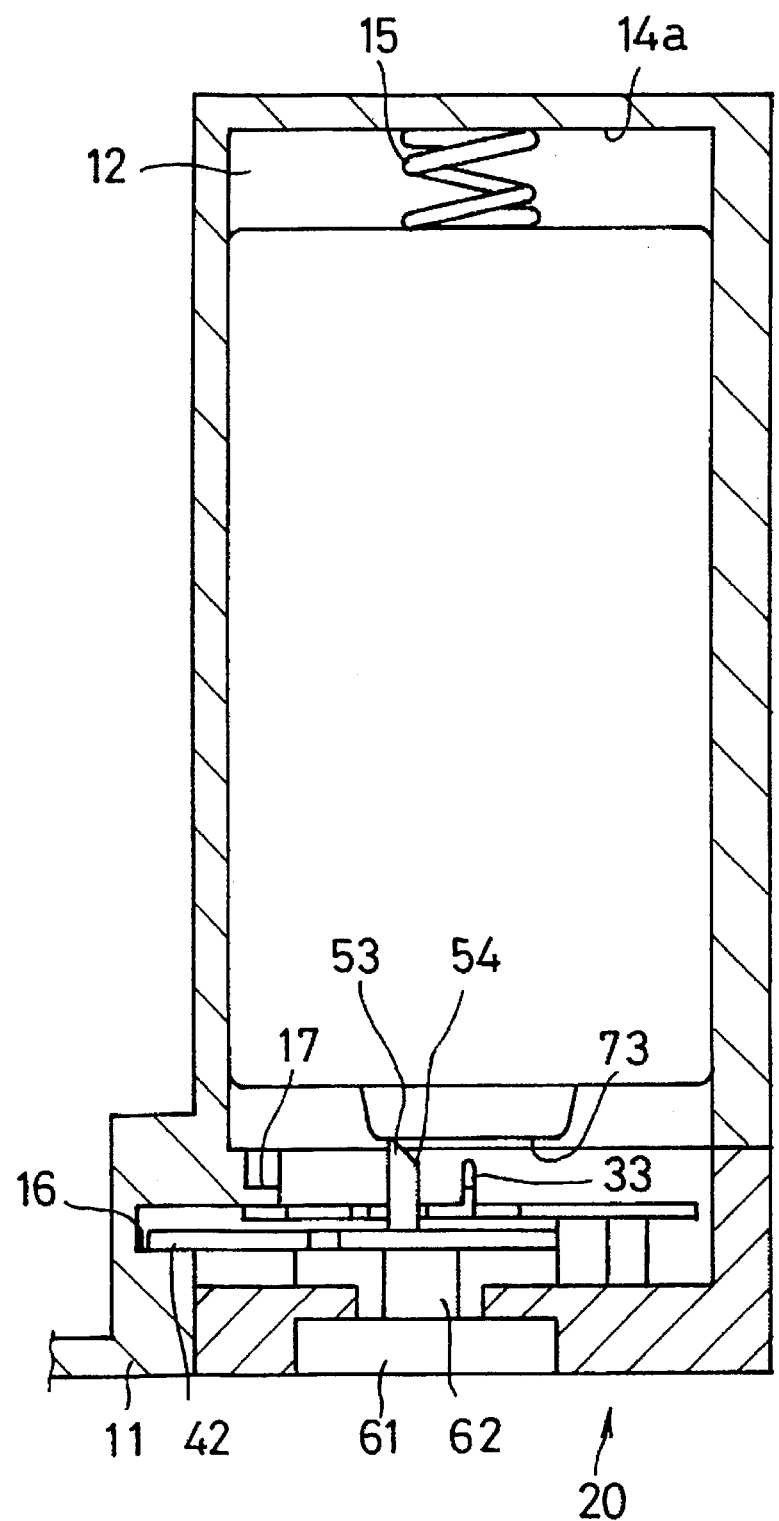
FIG. 4 is a sectional view of a battery chamber with a chamber cover in a nonconductive position, taken along the line A—A in FIG. 2.

To reset the function of the camera 10, the driver 61 is further rotated in the reset direction, i.e., the locking direction. Consequently, the oblique surface 54 moves the battery 71 against the biasing force of the resilient contact piece 15, etc., in the reset direction due to a wedge effect, while coming into sliding contact with the terminal 73. The movement of the battery 71 causes the terminal 73 to disconnect from the conductor piece 33, breaking the electrical connection therebetween (FIG. 4). Consequently, the power supply to a microcomputer, etc., from the battery 71 is cut-off deactivating the microcomputer. Thus, data stored in the RAM of the microcomputer is cleared and hence, the RAM is reset.

To return to a normal operation position, the driver 61 is rotated in the unlock direction. Consequently, the oblique surface 54 separates from the terminal 73, and the battery 71 is moved toward the conductor piece 33 under the biasing force of the resilient contact piece 15. The terminal 73 re-connected to the conductor piece 33 to supply the electrical power to the camera (FIG. 3). Thus, the microcomputer is energized and the reset operation can be completed.

As can be seen from the above discussion, according to the present invention, the microcomputer can be easily reset by rotating the driver 61 without removing the battery 71 from the battery chamber. Moreover, since the reset operation and the locking operation of the chamber cover 20 is carried out by the same operating member (driver 61), the structure of the battery receiving mechanism is simplified.

Although the above discussion has been directed to a detachable chamber cover 20, the present invention can be applied to a pivotable chamber cover. If the chamber cover is not located opposed to the terminal of the battery, the battery receiving mechanism is provided on the wall of the battery chamber or another portion of the battery chamber in which one of the terminals of the battery can be disconnected from the conductor piece.

The arrangement which moves the battery 71 is not limited to that of the illustrated embodiment, so long as an electrical connection between at least one of the terminals of the battery and the conductor is broken by the movement of the battery. For instance, although the operating member 53 is rotated by the driver 61 in the illustrated embodiment, the rotating mechanism can be replaced with a linearly moving mechanism to establish or break an electrical connection between at least one of the terminals of the battery and the conductor.

Figure 6:
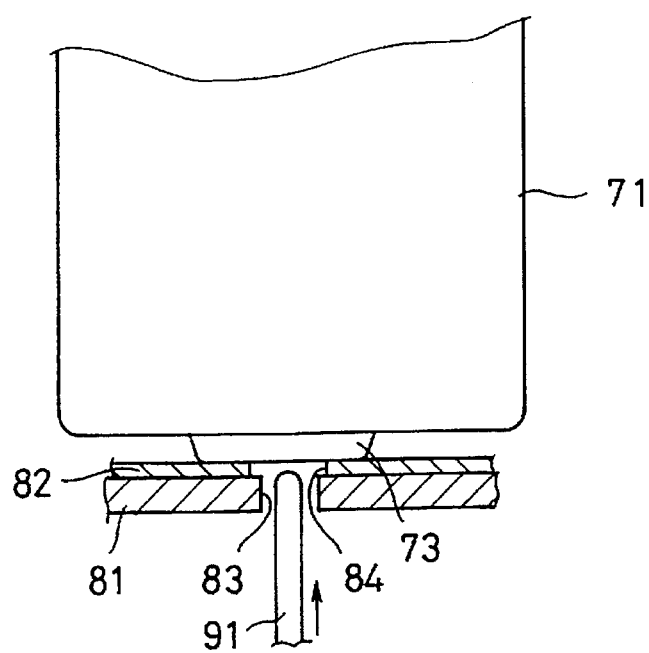
FIG. 6 is a sectional view of a battery receiving mechanism having a battery chamber with a chamber cover, according to a second embodiment of the present invention; and, FIG. 7 is a sectional view of a battery receiving mechanism having a battery chamber with a chamber cover, according to a third embodiment of the present invention.

FIG. 6 shows a second embodiment of the present invention.

In the second embodiment illustrated in FIG. 6, the chamber cover 81 and the contact piece 82 which comes into contact with the terminal 73 of the battery 71 are respectively provided with resetting holes 83 and 84 which open into the battery chamber. A rod (external tool) 91 is inserted in the resetting holes 83 and 84 to move the battery 71 to thereby disconnect the terminal 73 of the battery 71 from the contact piece 82.

Figure 7:
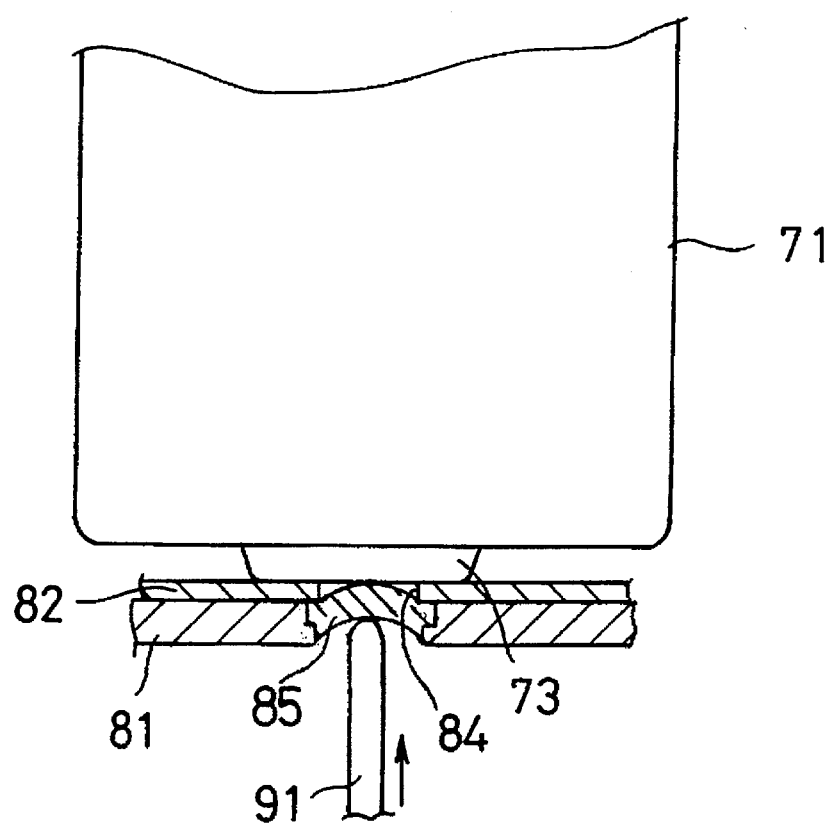

Although the chamber cover 81 is provided with the resetting hole 83 in the second embodiment, the resetting hole 83 can be replaced with a resilient or flexible member 85 elastically deformable and provided, on the deformable inner surface portion thereof opposed to the terminal 73 of the battery 71, with a contact portion with which the terminal 73 can be brought into contact (see FIG. 7). When an operator or photographer depresses the deformable inner surface portion of the resilient or flexible member 85 from the outside, the battery 71 is moved in the resetting direction, so that the terminal 73 is disconnected from the conductor piece 82.

The contact piece 15 in the form of a coil spring in the illustrated embodiment can be replaced with a leaf spring or other elastically deformable member made of an elastic material, such as rubber or synthetic resin, or metal, so long as the contact piece permits the battery 71 to move there against.

As can be understood from the above discussion, since the electrical connection between at least one of the terminals of the battery and the conductor piece can be broken by the movement of the battery received within the battery chamber without opening the chamber cover, electronic components, such as a microcomputer which are supplied with the electrical power from the battery can be easily reset.

We claim:

1. A battery receiving mechanism having a battery chamber for receiving a battery therein, and a conductor which connects to a first terminal of said battery, comprising:
    a biasing member which biases said battery in a first direction to connect said first terminal of said battery to said conductor; and,
    operating means for moving said battery in a second direction opposite said first direction to disconnect said first terminal of said battery from said conductor, against said biasing force of said biasing member, upon application of an external force.

2. A battery receiving mechanism according to claim 1, wherein said biasing member is an electrically conductive member connectable to a second terminal of said battery.

3. A battery receiving mechanism according to claim 2, wherein said biasing member is a coil spring.

4. A battery receiving mechanism according to claim 1, said operating means further comprising:
    an operating portion actuatable from outside of said battery chamber; and
    a working portion, associated with said operating portion, which moves into contact with said battery in said battery chamber to move said battery to a nonconductive position in which said first terminal of said battery disconnects from said conductor.

5. A battery receiving mechanism according to claim 4, further comprising a chamber cover to open and close said battery chamber, wherein said operating portion and said conductor are provided on said chamber cover.

6. A battery receiving mechanism according to claim 1 wherein said operating means is provided with an operation portion rotatably supported on a chamber cover.

7. A battery receiving mechanism according to claim 6, wherein said operating means includes a locking member rotatable together with said operating portion between an open/close position in which said chamber cover can be opened, and a locked position in which said chamber cover is locked in a closed position.

8. A battery receiving mechanism according to claim 7, wherein said locking member is in said locked position during rotation of said operating portion from a conductive position, in which said first terminal of said battery is connected to said conductor, to a nonconductive position, in which said first terminal is disconnected from said conductor.

9. A battery receiving mechanism according to claim 1, wherein said battery receiving mechanism is provided in a camera body.

* * * * *